(12) United States Patent
Cho et al.

(10) Patent No.: US 11,245,119 B2
(45) Date of Patent: *Feb. 8, 2022

(54) CARRIER-NANOPARTICLE COMPOSITE, CATALYST COMPRISING SAME, AND METHOD FOR PRODUCING SAME

(71) Applicant: LG CHEM, LTD., Seoul (KR)

(72) Inventors: Jun Yeon Cho, Daejeon (KR); Kwanghyun Kim, Daejeon (KR); Gyo Hyun Hwang, Daejeon (KR); Sang Hoon Kim, Daejeon (KR); Ran Choi, Daejeon (KR); Wonkyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 467 days.

This patent is subject to a terminal disclaimer.

(21) Appl. No.: 16/097,606

(22) PCT Filed: Apr. 28, 2017

(86) PCT No.: PCT/KR2017/004560
§ 371 (c)(1),
(2) Date: Oct. 29, 2018

(87) PCT Pub. No.: WO2017/191945
PCT Pub. Date: Nov. 9, 2017

(65) Prior Publication Data
US 2020/0328430 A1   Oct. 15, 2020

(30) Foreign Application Priority Data
May 2, 2016  (KR) ........................ 10-2016-0054223

(51) Int. Cl.
*H01M 4/92* (2006.01)
*H01M 8/1004* (2016.01)
(Continued)

(52) U.S. Cl.
CPC .......... *H01M 4/926* (2013.01); *B01J 35/023* (2013.01); *C08G 73/0206* (2013.01);
(Continued)

(58) Field of Classification Search
None
See application file for complete search history.

(56) References Cited

U.S. PATENT DOCUMENTS 6,214,488 B1   4/2001   Helmer-Metzmann et al.
8,795,927 B2 *  8/2014   Miyake ............... H01M 8/1044
                                                       429/529
(Continued)

FOREIGN PATENT DOCUMENTS

CN   1672796   9/2005
CN   1713423   12/2005
(Continued)

OTHER PUBLICATIONS

Berber et al., "A highly durable fuel cell electrocatalyst based on double-polymer-coated carbon nanotubes," Scientific Reports, 5, 16711 (2015), Published Nov. 23, 2015 (Year: 2015).*
(Continued)

*Primary Examiner* — Amanda J Barrow
(74) *Attorney, Agent, or Firm* — Dentons US LLP

(57) ABSTRACT

A carrier-nanoparticle complex including a carbon carrier, a polymer layer provided on the surface of the carbon carrier and having an amine group and a hydrogen ion exchange group, and metal nanoparticles provided on the polymer layer, a catalyst including the same, an electrochemical battery or a fuel cell including the catalyst, and a method for preparing the same.

18 Claims, 6 Drawing Sheets

(51) Int. Cl.
*H01M 8/1018* (2016.01)
*C08J 5/22* (2006.01)
*C08G 73/02* (2006.01)
*B01J 35/02* (2006.01)
*B82Y 40/00* (2011.01)

(52) U.S. Cl.
CPC ......... *C08J 5/2256* (2013.01); *H01M 8/1004* (2013.01); *H01M 8/1018* (2013.01); *B82Y 40/00* (2013.01); *C08J 2379/02* (2013.01); *H01M 2008/1095* (2013.01)

(56) References Cited

U.S. PATENT DOCUMENTS

| | | | |
|---|---|---|---|
| 9,045,607 B2 | 6/2015 | Song et al. | |
| 2002/0019308 A1* | 2/2002 | Hitomi | B01J 23/42 502/159 |
| 2005/0053818 A1* | 3/2005 | St-Arnaud | B01D 69/141 429/431 |
| 2005/0215427 A1 | 9/2005 | Suh et al. | |
| 2005/0287418 A1 | 12/2005 | Noh et al. | |
| 2006/0008697 A1 | 1/2006 | Kim et al. | |
| 2006/0051657 A1 | 3/2006 | Terada et al. | |
| 2006/0275648 A1* | 12/2006 | Kim | H01M 4/9016 429/483 |
| 2007/0117958 A1* | 5/2007 | Mohwald | H01M 8/1025 528/220 |
| 2008/0026936 A1 | 1/2008 | Suh et al. | |
| 2008/0038615 A1* | 2/2008 | Son | H01M 8/1007 429/483 |
| 2008/0096078 A1* | 4/2008 | Miyake | H01M 4/8605 429/483 |
| 2009/0068527 A1 | 3/2009 | Kurungot et al. | |
| 2010/0028745 A1* | 2/2010 | Salguero | H01M 4/8663 429/483 |
| 2011/0082222 A1* | 4/2011 | Ziser | H01M 8/1025 521/38 |
| 2011/0195339 A1 | 8/2011 | Iijima et al. | |
| 2012/0315568 A1 | 12/2012 | Lee et al. | |
| 2015/0024304 A1* | 1/2015 | Nakashima | H01M 4/8878 429/530 |
| 2017/0279124 A1 | 9/2017 | Kim et al. | |
| 2019/0088966 A1* | 3/2019 | Choi | H01M 4/921 |

FOREIGN PATENT DOCUMENTS

| | | |
|---|---|---|
| CN | 1774827 | 5/2006 |
| CN | 100379063 | 4/2008 |
| EP | 3363543 | 8/2018 |
| JP | H6-93114 | 4/1994 |
| JP | 2005122925 | 5/2005 |
| JP | 200624572 | 1/2006 |
| JP | 200712616 | 1/2007 |
| JP | 2007273449 | 10/2007 |
| JP | 2009-231158 | 10/2009 |
| JP | 2009-238496 | 10/2009 |
| JP | 2010102982 | 5/2010 |
| JP | 2010-123572 | 6/2010 |
| JP | 4518203 | 8/2010 |
| JP | 2010-192436 | 9/2010 |
| JP | 2015233010 | 12/2015 |
| JP | 2016014080 | 1/2016 |
| KR | 10-2006-0004780 | 1/2006 |
| KR | 10-2006-0055632 | 5/2006 |
| KR | 10-2007-0119230 | 12/2007 |
| KR | 10-0953545 | 4/2010 |
| KR | 10-1536623 | 7/2015 |
| KR | 10-2016-0007888 | 1/2016 |
| KR | 10-2016-0022156 | 2/2016 |

OTHER PUBLICATIONS

Product data sheet for Nafion™ perfluorinated resin solution product data sheet from Sigma-Aldrich, accessed Apr. 22, 2020 (Year: 2020).*

Geng et al., "In Situ Synthesis and Characterization of Polyethyleimine-Modified Carbon Nanotubes Supported PtRu Electrocatalyst for Methanol Oxidation," J. Nanomaterials, vol. 2015, Published Jan. 19, 2015 (Year: 2015).*

Kuo et al., "Multichelate-functionalized carbon nanospheres used for immobilizing Pt catalysts for fuel cells," J. Power Sources, 194 (2009) 234-242 (Year: 2009).*

* cited by examiner

[Figure 1]
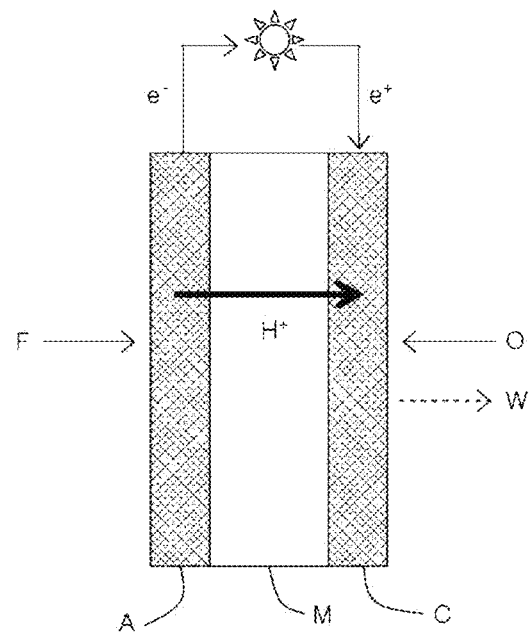
[Figure 2]
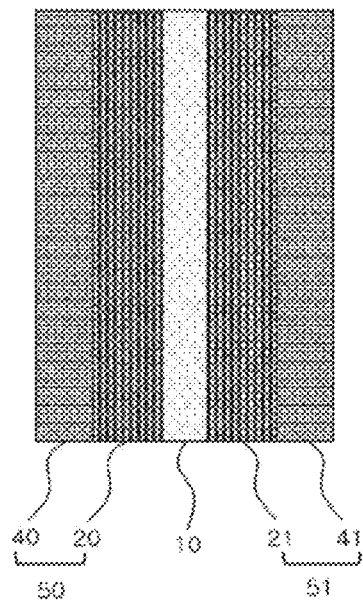

[Figure 3]
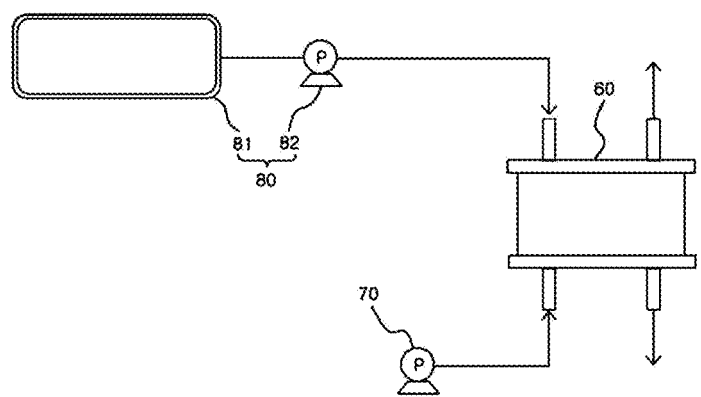
[Figure 4]
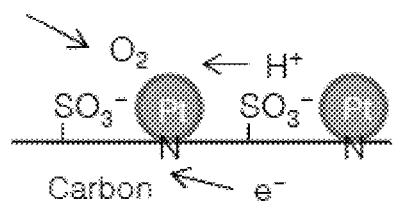

[Figure 5]
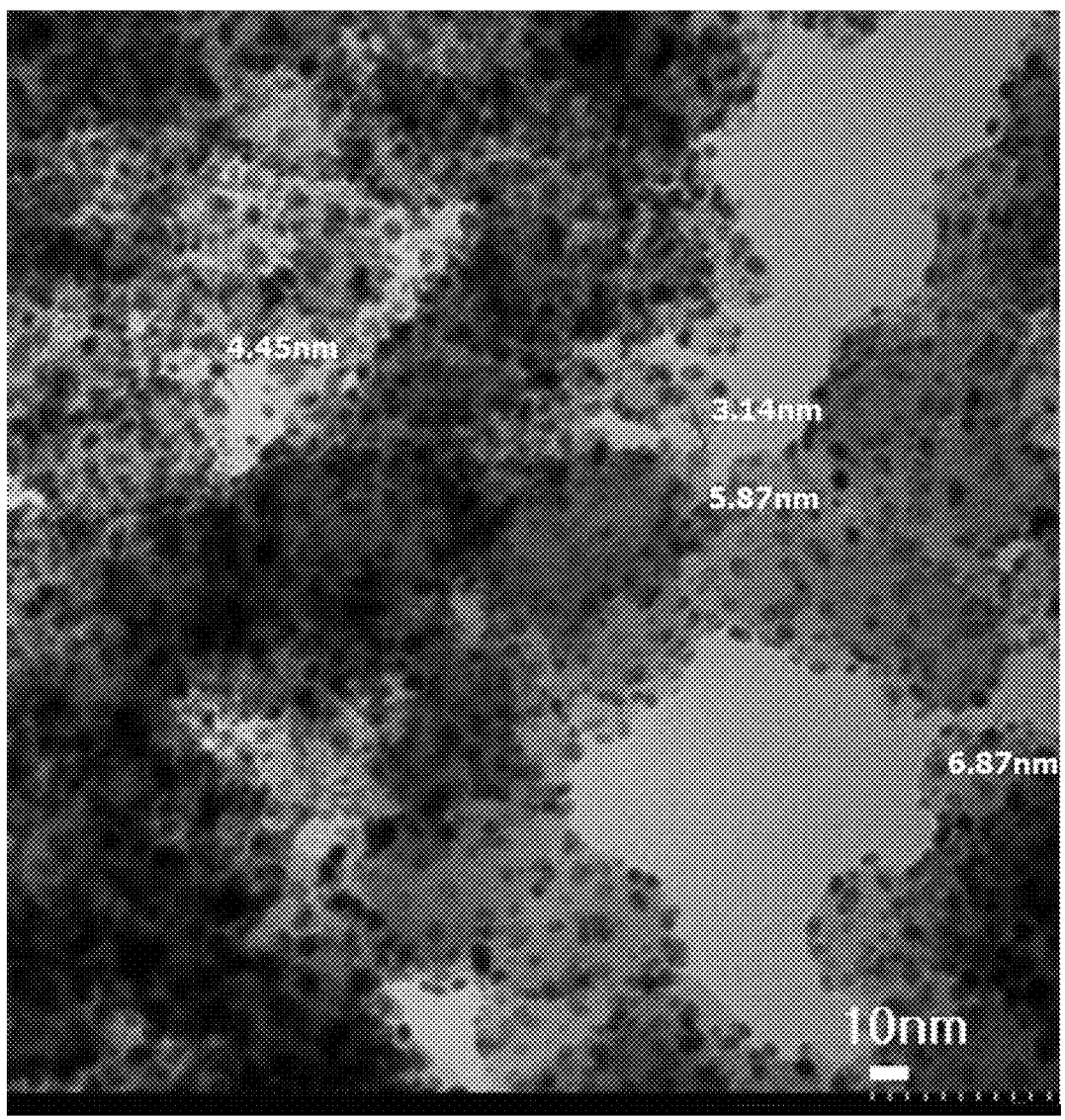

[Figure 6]
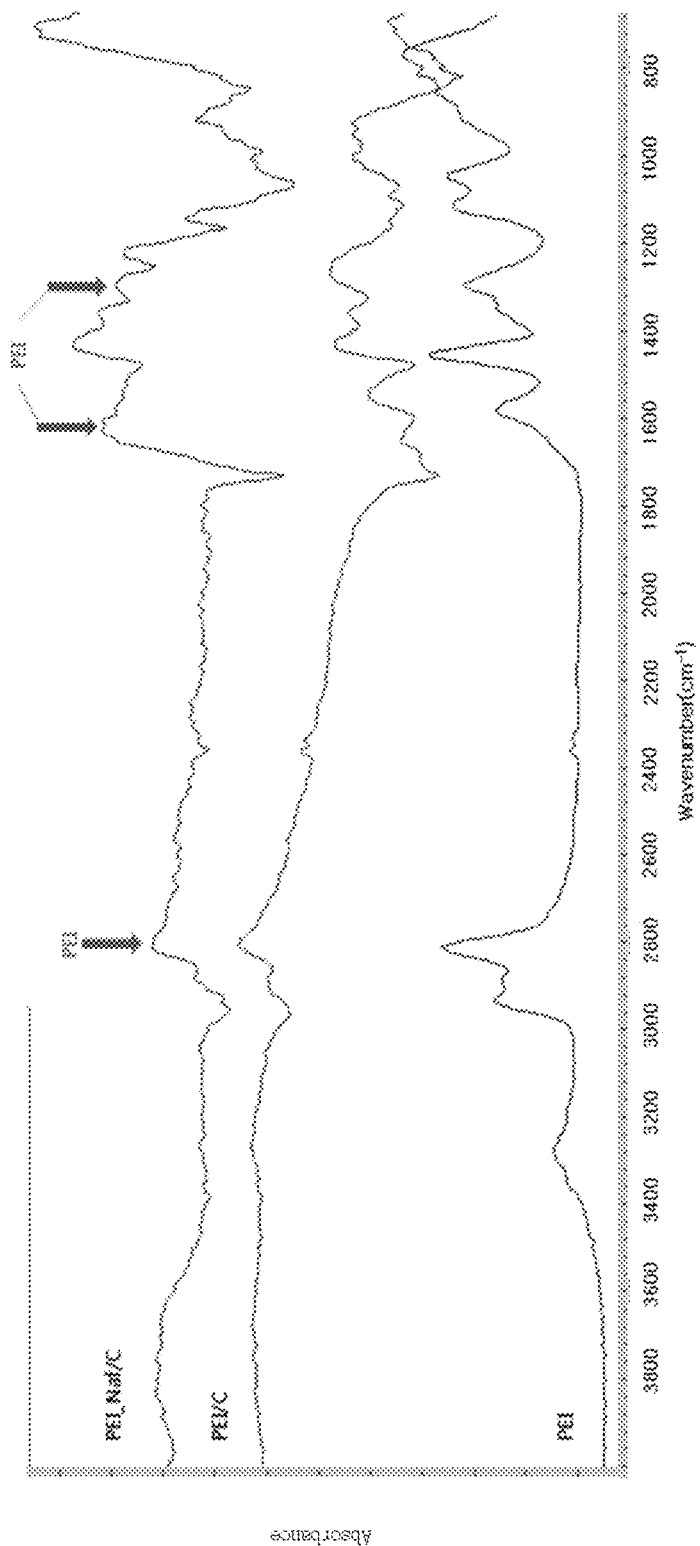

[Figure 7]
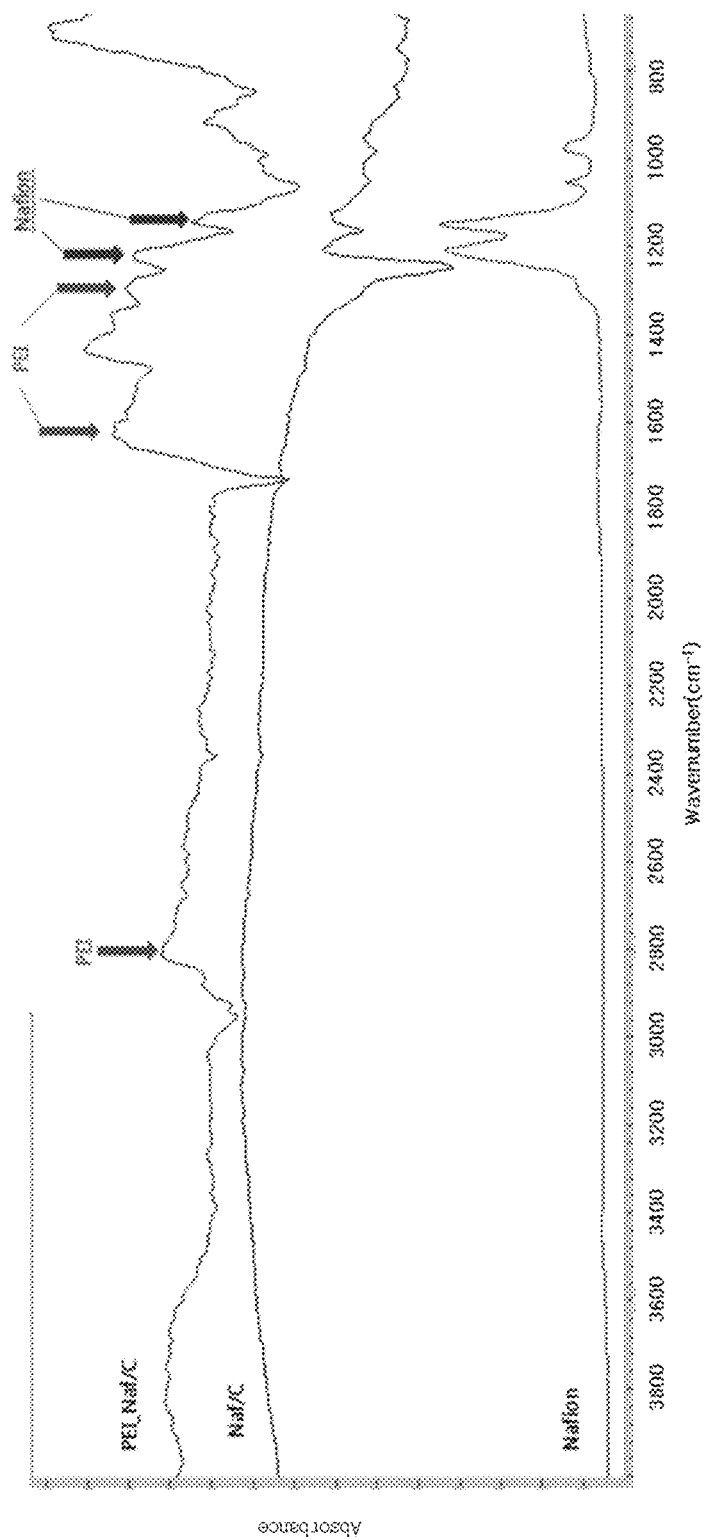

[Figure 8]
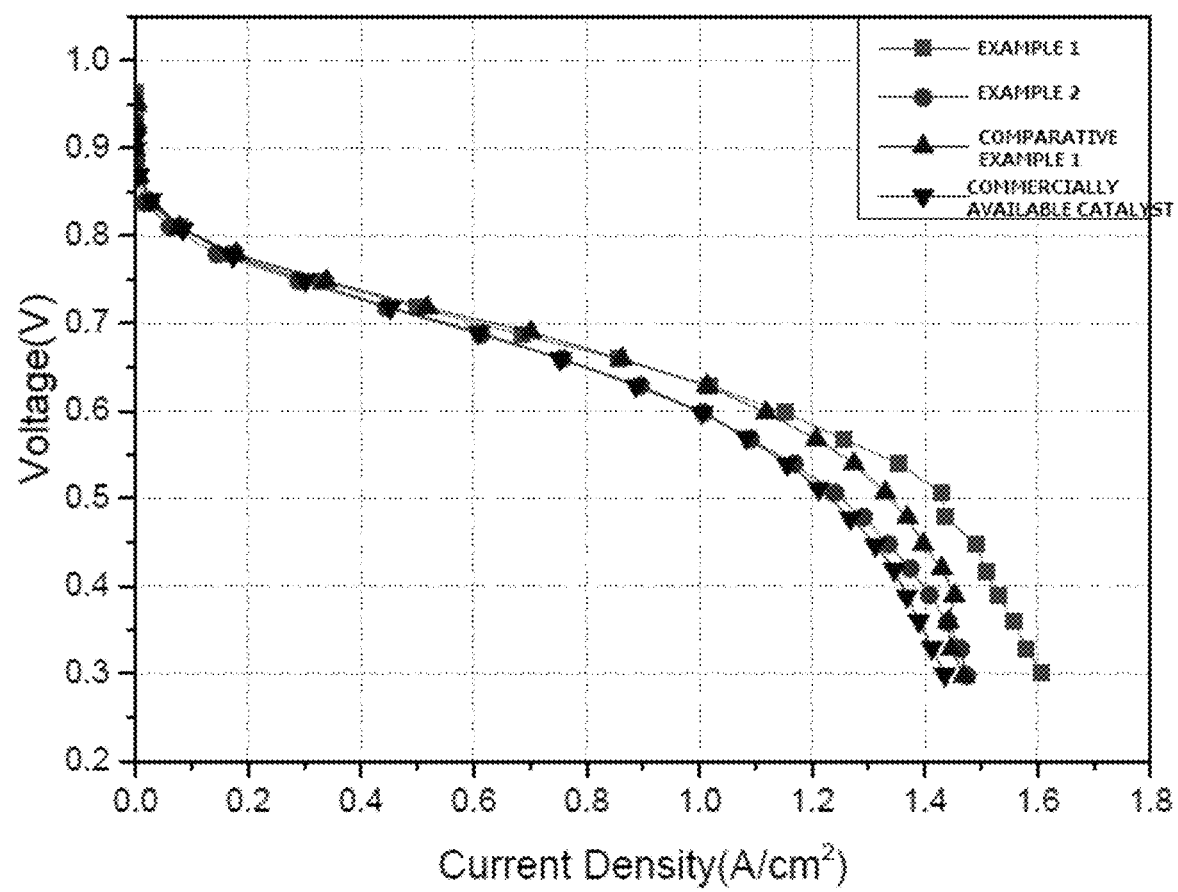

CARRIER-NANOPARTICLE COMPOSITE, CATALYST COMPRISING SAME, AND METHOD FOR PRODUCING SAME

This application is a National Stage Application of International Application No. PCT/KR2017/004560 filed on Apr. 28, 2017, which claims priority to and the benefit of Korean Patent Application No. 10-2016-0054223 filed in the Korean Intellectual Property Office on May 2, 2016, the entire contents of which are incorporated herein by reference in their entirety for all purposes as if fully set forth herein.

TECHNICAL FIELD

The present specification relates to a carrier-nanoparticle complex, a catalyst including the same, an electrochemical battery or a fuel cell including the catalyst, and a method for preparing the same.

BACKGROUND ART

Carbon black is generally used as a support of a fuel cell catalyst. However, when carbon black is used as a support, there occurs a problem with the durability due to the corrosion of carbon.

In order to alleviate the problem, studies on carbon nanotube (CNT), carbon nanofiber (CNF), carbon nanocage (CNC), and the like, which are crystalline carbon forms having a high corrosion resistance, have been actively conducted. However, these crystalline carbon forms have a problem in that these carbon forms are not dispersed well in a polar solvent due to the strong surface water repellency thereof. For this reason, there is a problem in that platinum is agglomerated without being uniformly dispersed in the process of loading platinum into a carbon support.

DETAILED DESCRIPTION OF THE INVENTION

Technical Problem

The present specification has been made in an effort to provide a carrier-nanoparticle complex, a catalyst including the same, an electrochemical battery or a fuel cell including the catalyst, and a method for preparing the same.

Technical Solution

The present specification provides a carrier-nanoparticle complex including: a carbon carrier; a polymer layer provided on a surface of the carbon carrier and having an amine group and a hydrogen ion exchange group represented by the following Chemical Formula 12; and metal nanoparticles provided on the polymer layer.

   [Chemical Formula 12]

In Chemical Formula 12, X is a monovalent cation group.

Further, the present specification provides a catalyst including the carrier-nanoparticle complex.

In addition, the present specification provides an electrochemical battery including the catalyst.

Furthermore, the present specification a membrane electrode assembly including: an anode catalyst layer; a cathode catalyst layer; and a polymer electrolyte membrane provided between the anode catalyst layer and the cathode catalyst layer, in which at least one of the anode catalyst layer and the cathode catalyst layer includes the carrier-nanoparticle complex.

Further, the present specification provides a method for preparing a carrier-nanoparticle complex, the method including: forming a polymer layer having an amine group and a hydrogen ion exchange group represented by the following Chemical Formula 12 in a carbon carrier; and forming metal nanoparticles on the polymer layer of the carbon carrier by adding the carbon carrier having the polymer layer formed and a metal precursor to a solvent.

   [Chemical Formula 12]

In Chemical Formula 12, X is a monovalent cation group.

Advantageous Effects

A carrier-nanoparticle complex according to an exemplary embodiment of the present specification has an advantage in that the dispersibility of metal nanoparticles is excellent.

The carrier-nanoparticle complex according to an exemplary embodiment of the present specification has an advantage in that the thermal stability is excellent.

The carrier-nanoparticle complex according to an exemplary embodiment of the present specification may transfer protons well to an active metal site, and thus may increase a use rate of metal nanoparticles.

BRIEF DESCRIPTION OF DRAWINGS

FIG. 1 is a schematic view illustrating an electricity generation principle of a fuel cell.

FIG. 2 is a view schematically illustrating a structure of a membrane electrode assembly for a fuel cell.

FIG. 3 is a view schematically illustrating an example of a fuel cell.

FIG. 4 is a schematic view of a reaction on a surface of a carrier-nanoparticle complex according to an exemplary embodiment of the present specification.

FIG. 5 is a TEM measurement image of a carrier-nanoparticle complex prepared in Example 1.

FIG. 6 is an FT-IR analysis graph for Example 1 and Comparative Example 1 together with PEI.

FIG. 7 is an FT-IR analysis graph for Example 1 and Comparative Example 1 together with Nafion.

FIG. 8 is a unit cell performance result graph for Examples 1 and 2 and Comparative Example 1 together with a commercially available catalyst.

EXPLANATION OF REFERENCE NUMERALS AND SYMBOLS

10: Electrolyte membrane
20, 21: Catalyst layer
40, 41: Gas diffusion layer
50: Cathode
51: Anode
60: Stack
70: Oxidizing agent supplying part
80: Fuel supplying part
81: Fuel tank
82: Pump

BEST MODE

Hereinafter, the present specification will be described in detail.

The present specification provides a carrier-nanoparticle complex including: a carbon carrier; a polymer layer provided on a surface of the carbon carrier and having an amine group and a hydrogen ion exchange group represented by the following Chemical Formula 12; and metal nanoparticles provided on the polymer layer.

   [Chemical Formula 12]

In Chemical Formula 12, X is a monovalent cation group.

The carbon-based carrier may include one or more selected from the group consisting of carbon black, carbon nanotube (CNT), graphite, graphene, activated carbon, mesoporous carbon, carbon fiber, and carbon nano wire.

A portion or all of the surface of the carbon carrier may be provided with a polymer layer. 50% or more and 100% or less of the surface of the carbon carrier may be provided with a polymer layer, and specifically, 75% or more and 100% or less thereof may be provided with a polymer layer.

Based on the total elements on the surface of the polymer layer, the content of the nitrogen element of an amine group may be 0.01 wt % or more and 5 wt % or less, and the content of the sulfur element of the hydrogen ion exchange group of Chemical Formula 12 may be 0.01 wt % or more and 1 wt % or less. When the content of the sulfur element is more than 1 wt %, the carrier surface becomes so hydrophilic that an adverse effect may be shown in the discharge of water in a cell.

The polymer layer may include a polyalkyleneimine having an amine group and a hydrogen ion exchange polymer having the hydrogen ion exchange group, or may include a polymer derived from a polyalkyleneimine having an amine group and a hydrogen ion exchange polymer having a hydrogen ion exchange group.

A weight ratio (PEI/ionomer) of the polyalkyleneimine (PEI) and the hydrogen ion exchange polymer (ionomer) may be 15 or more and 100 or less.

The polyalkyleneimine may be a polymer having an aliphatic hydrocarbon main chain and including at least 10 amine groups or more at the main chain and side chain thereof. At this time, the amine group includes a primary amine group, a secondary amine group, a tertiary amine group, and a quaternary amine group, and in the amine group included in the main chain and side chain of the polyalkyleneimine, at least one of the primary amine group, the secondary amine group, the tertiary amine group, and the quaternary amine group may be 10 or more.

The polyalkyleneimine may have a weight average molecular weight of 500 or more and 1,000,000 or less.

The polyalkyleneimine may include at least one of a repeating unit represented by the following Chemical Formula 1 and a repeating unit represented by the following Chemical Formula 2.

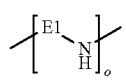   [Chemical Formula 1]

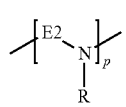   [Chemical Formula 2]

In Chemical Formulae 1 and 2, E1 and E2 are each independently an alkylene group having 2 to 10 carbon atoms, R is a substituent represented by any one of the following Chemical Formulae 3 to 5, and o and p are each an integer from 1 to 1,000,

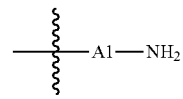   [Chemical Formula 3]

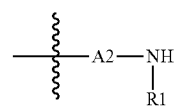   [Chemical Formula 4]

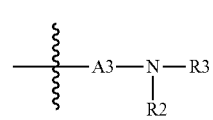   [Chemical Formula 5]

In Chemical Formulae 3 to 5, A1 to A3 are each independently an alkylene group having 2 to 10 carbon atoms, and R1 to R3 are each independently a substituent represented by any one of the following Chemical Formulae 6 to 8,

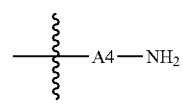   [Chemical Formula 6]

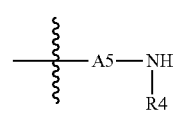   [Chemical Formula 7]

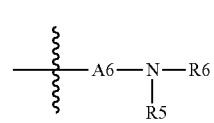   [Chemical Formula 8]

In Chemical Formulae 6 to 8, A4 to A6 are each independently an alkylene group having 2 to 10 carbon atoms, and R4 to R6 are each independently a substituent represented by the following Chemical Formula 9,

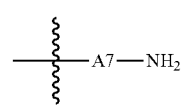   [Chemical Formula 9]

In Chemical Formula 9, A7 is an alkylene group having 2 to 10 carbon atoms.

The polyalkyleneimine may include at least one of a compound represented by the following Chemical Formula 10 and a compound represented by the following Chemical Formula 11.

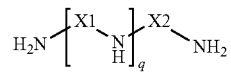   [Chemical Formula 10]

[Chemical Formula 11]

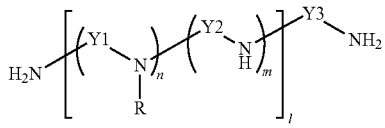

In Chemical Formulae 10 and 11, X1, X2, Y1, Y2, and Y3 are each independently an alkylene group having 2 to 10 carbon atoms, R is a substituent represented by any one of the following Chemical Formulae 3 to 5, q is an integer from 1 to 1,000, n and m are each an integer from 1 to 5, and 1 is an integer from 1 to 200.

[Chemical Formula 3]

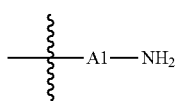

[Chemical Formula 4]

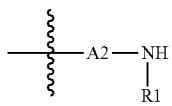

[Chemical Formula 5]

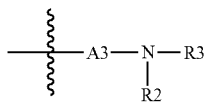

In Chemical Formulae 3 to 5, A1 to A3 are each independently an alkylene group having 2 to 10 carbon atoms, and R1 to R3 are each independently a substituent represented by any one of the following Chemical Formulae 6 to 8,

[Chemical Formula 6]

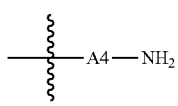

[Chemical Formula 7]

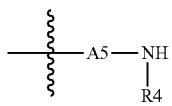

[Chemical Formula 8]

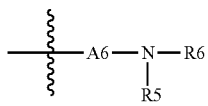

In Chemical Formulae 6 to 8, A4 to A6 are each independently an alkylene group having 2 to 10 carbon atoms, and R4 to R6 are each independently a substituent represented by the following Chemical Formula 9,

[Chemical Formula 9]

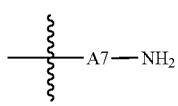

In Chemical Formula 9, A7 is an alkylene group having 2 to 10 carbon atoms.

In the present specification,

means a substitution position of a substituent.

In the present specification, the alkylene group may be straight or branched, and the number of carbon atoms thereof is not particularly limited, but is preferably 2 to 10. Specific examples thereof include an ethylene group, a propylene group, an isopropylene group, a butylene group, a t-butylene group, a pentylene group, a hexylene group, a heptylene group, and the like, but are not limited thereto.

The hydrogen ion exchange polymer includes a hydrogen ion exchange group represented by the following Chemical Formula 12.

—SO$_3^-$X   [Chemical Formula 12]

In Chemical Formula 12, X is a monovalent cation group.

Since proton is easily transferred to a metal nanoparticle bonded to an amine group on the polymer layer through a hydrogen ion exchange group, a use rate of metal nanoparticles may be increased.

As illustrated in FIG. 4, a platinum particle being a metal nanoparticle is bonded to an amine group on the surface of the polymer layer, and H$^+$ is transferred to the platinum particle being an active metal site through a hydrogen ion exchange group of the polymer layer on the surface of the carbon carrier, so that platinum particles are easily used.

The hydrogen ion exchange polymer is not particularly limited as long as the hydrogen ion exchange polymer includes the hydrogen ion exchange group represented by Chemical Formula 12, and it is possible to use a hydrogen ion exchange polymer generally used in the art.

The hydrogen ion exchange polymer may be a hydrocarbon-based polymer, a partially fluorine-based polymer, or a fluorine-based polymer. The hydrocarbon-based polymer may be a hydrocarbon-based sulfonated polymer having no fluorine group, and in contrast, the fluorine-based polymer may be a sulfonated polymer which is saturated with a fluorine group, and the partially fluorine-based polymer may be a sulfonated polymer which is not saturated with a fluorine group.

The hydrogen ion exchange polymer may be one polymer or two or more polymers selected from the group consisting of a perfluorosulfonic acid-based polymer, a hydrocarbon-based polymer, an aromatic sulfone-based polymer, an aromatic ketone-based polymer, a polybenzimidazole-based polymer, a polystyrene-based polymer, a polyester-based polymer, a polyimide-based polymer, a polyvinylidene fluoride-based polymer, a polyethersulfone-based polymer, a polyphenylene sulfide-based polymer, a polyphenylene oxide-based polymer, a polyphosphazene-based polymer, a polyethylene naphthalate-based polymer, a polyester-based polymer, a doped polybenzimidazole-based polymer, a polyether ketone-based polymer, a polyphenylquinoxaline-based polymer, a polysulfone-based polymer, a polypyrrole-based polymer, and a polyaniline-based polymer. The polymer may be a single copolymer, an alternating copolymer, a random copolymer, a block copolymer, a multi-block copolymer, or a graft copolymer, but is not limited thereto.

Examples of the hydrogen ion exchange polymer may include at least one of a cation include at least one of Nafion, sulfonated polyether ether ketone (sPEEK), sulfonated polyether ketone (sPEK), poly(vinylidene fluoride)-graft-poly(styrene sulfonic acid) (PVDF-g-PSSA), and sulfonated poly(fluorenyl ether ketone).

If the amine group of the polyalkyleneimine and the hydrogen ion exchange group of the hydrogen ion exchange polymer are adjacent to each other, the two groups may be bonded to each other to have a sulfonamide bonding structure (—SO$_2$—NH—) through a chemical reaction.

The polymer layer may include a polymer in which the amine group of the polyalkyleneimine and the hydrogen ion exchange group of the hydrogen ion exchange polymer are crosslinked to each other through a crosslinking agent capable of reacting with each of the two groups.

The crosslinking agent is not particularly limited as long as the crosslinking agent may crosslink the amine group of the polyalkyleneimine and the hydrogen ion exchange group of the hydrogen ion exchange polymer, but for example, POCl$_3$, and the like may be used.

As in the following Reaction Formula 1, the polymer layer may include a polymer in which a hydrogen ion exchange group (P1-SO$_3$H) of the hydrogen ion exchange polymer and the amine group (P2-NH$_2$) of the polyalkyleneimine are crosslinked to each other to form a sulfonamide bonding structure (—SO$_2$—NH—) by POCl$_3$ being a crosslinking agent.

[Reaction Formula 1]

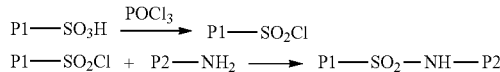

In the reaction formula, P1 is a hydrogen ion exchange polymer except for —SO$_3$H being a hydrogen ion exchange group, and P2 is a polyalkyleneimine except for —NH$_2$ in the amine group.

The metal nanoparticle may be bonded to the amine group of the polymer layer, and specifically, may be bonded to the amine group of the polyalkyleneimine.

The metal nanoparticle may include one or two or more metals selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu). Specifically, the metal nanoparticle may include: platinum (Pt); and a platinum alloy in which iron (Fe), cobalt (Co), nickel (Ni), palladium (Pd), rhodium (Rh), or ruthenium (Ru) is alloyed with platinum (Pt).

The metal nanoparticles may have an average particle diameter of 2 nm or more and 20 nm or less, and specifically, 3 nm or more and 10 nm or less. In this case, there is an advantage in that the catalyst efficiency is high because metal nanoparticles are not aggregated with each other and are dispersed well on a carbon carrier. Here, the average particle diameter of the metal nanoparticles means the average of the lengths of the longest lines among lines that link two points on the surface of the metal nanoparticle.

The metal nanoparticle may have a spherical shape. In the present specification, the spherical shape does not mean only a perfect spherical shape, and may include a roughly spherical shape. For example, in the metal nanoparticle, the outer surface having a spherical shape may not be smooth, and the radius of curvature in one metal nanoparticle may not be constant.

The content of the metal nanoparticles may be 15 wt % or more and 50 wt % or less based on the total weight of the carrier-nanoparticle complex. Specifically, the content of the metal nanoparticles may be 20 wt % or more and 40 wt % or less based on the total weight of the carrier-nanoparticle complex.

The present specification provides a catalyst including the carrier-nanoparticle complex.

The present specification provides an electrochemical battery including the catalyst.

The electrochemical battery means a battery which uses chemical reactions, and is not particularly limited in type as long as the battery includes the catalyst, but for example, the electrochemical battery may be a fuel cell, a metal secondary battery, or a flow battery.

The present specification provides an electrochemical battery module including the electrochemical battery as a unit cell.

The electrochemical battery module may be formed by inserting a bipolar plate between flow batteries according to one exemplary embodiment of the present application to stack the batteries.

The battery module may be specifically used as a power source for an electric vehicle, a hybrid electric vehicle, a plug-in hybrid electric vehicle, or a power storage device.

The present specification provides a membrane electrode assembly including: an anode catalyst layer; a cathode catalyst layer; and a polymer electrolyte membrane provided between the anode catalyst layer and the cathode catalyst layer, in which at least one of the anode catalyst layer and the cathode catalyst layer includes the carrier-nanoparticle complex.

The membrane electrode assembly may further include an anode gas diffusion layer provided on a surface opposite to a surface of the anode catalyst layer on which the polymer electrolyte membrane is provided and a cathode gas diffusion layer provided on a surface opposite to a surface of the cathode catalyst layer on which the polymer electrolyte membrane is provided.

The present specification provides a fuel cell including the membrane electrode assembly.

FIG. 1 schematically illustrates an electricity generation principle of a fuel cell, and in a fuel cell, the most fundamental unit of generating electricity is a membrane electrode assembly (MEA), and the membrane electrode assembly is composed of an electrolyte membrane (M), and an anode (A) and a cathode (C) formed on both surfaces of the electrolyte membrane (M). Referring to FIG. 1 which illustrates an elasticity generation principle of a fuel cell, an oxidation reaction of fuel (F) such as hydrogen or a hydrocarbon such as methanol and butane occurs in the anode (A), and as a result, hydrogen ions (H$^+$) and electrons (e$^-$) are generated, and the hydrogen ions move to the cathode (C) through the electrolyte membrane (M). In the cathode (C), hydrogen ions transferred through the electrolyte membrane (M), an oxidizing agent (O) such as oxygen, and electrons are reacted to produce water (W). Electrons move to an external circuit by the reaction.

FIG. 2 schematically illustrates a structure of a membrane electrode assembly for a fuel cell, and the membrane electrode assembly for the fuel cell may include an electrolyte membrane 10, and a cathode 50 and an anode 51 facing each other with the electrolyte membrane 10 interposed therebetween. In the cathode, a cathode catalyst layer 20, and a cathode gas diffusion layer 40 may be provided sequentially from the electrolyte membrane 10, and in the anode, an anode catalyst layer 21, and an anode gas diffusion layer 41 may be provided sequentially from the electrolyte membrane 10.

The catalyst according to the present specification may be included in at least one of a cathode catalyst layer and an anode catalyst layer in a membrane electrode assembly.

FIG. 3 schematically illustrates a structure of a fuel cell, and the fuel cell includes a stack 60, an oxidizing agent supplying part 70, and a fuel supplying part 80.

The stack 60 includes the aforementioned one membrane-electrode assembly or two or more membrane-electrode assemblies, and when two or more membrane-electrode assemblies are included, the stack 60 includes a separator interposed therebetween. The separator serves to prevent the membrane-electrode assemblies from being electrically connected to each other, and to transfer fuel and an oxidizing agent, which are supplied from the outside, to the membrane-electrode assemblies.

The oxidizing agent supplying part 70 serves to supply an oxidizing agent to the stack 60. As the oxidizing agent, oxygen is representatively used, and oxygen or air may be used by being injected into the oxidizing agent supplying part 70.

The fuel supplying part 80 serves to supply fuel to the stack 60, and may be composed of a fuel tank 81 which stores fuel, and a pump 82 which supplies the stack 60 with fuel stored in the fuel tank 81. As the fuel, hydrogen or hydrocarbon fuel in a gas or liquid state may be used. Examples of the hydrocarbon fuel may include methanol, ethanol, propanol, butanol, or natural gases.

At least one of the anode catalyst layer and the cathode catalyst layer may include the carrier-nanoparticle complex according to the present specification as a catalyst.

The anode catalyst layer and the cathode catalyst layer may each include an ionomer.

When the anode catalyst layer includes the carrier-nanoparticle complex, the ratio of the ionomer of the anode catalyst layer to the carrier-nanoparticle complex (ionomer/complex, I/C) is 0.3 to 0.7.

When the cathode catalyst layer includes the carrier-nanoparticle complex, the ratio of the ionomer of the cathode catalyst layer to the carrier-nanoparticle complex (ionomer/complex, I/C) is 0.3 to 0.7.

In general, considering that the I/C ratio used in a commercially available catalyst is 0.8 to 1 (Book "PEM Fuel Cell Electrocatalyst and Catalyst Layer", page 895), when the carrier-nanoparticle complex according to the present specification is included as a catalyst, the content of the carrier-nanoparticle complex may be reduced by 20 wt % or more based on the content of the ionomer required for the catalyst layer, may be reduced by specifically 30 wt % or more, and may be reduced by more specifically 50 wt % or more. In other words, there is an advantage in that the content of the expensive ionomer may be reduced, and a predetermined or more hydrogen ion conductivity may be maintained even with a small ionomer content.

The ionomer serves to provide a channel through which ions produced by a reaction between fuel such as hydrogen or methanol and a catalyst move to an electrolyte membrane.

The ionomer may use a polymer having a cation exchange group, which is selected from the group consisting of a sulfonic acid group, a carboxylic acid group, a phosphoric acid group, a phosphonic acid group, and a derivative thereof, at the side chain thereof. Specifically, the ionomer may include one or more hydrogen ion conductive polymers selected from a fluoro-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone-based polymer, or a polyphenylquinoxaline-based polymer. Specifically, according to an exemplary embodiment of the present specification, the polymer ionomer may be Nafion.

The present specification provides a method for preparing a carrier-nanoparticle complex, the method including: forming a polymer layer having an amine group and a hydrogen ion exchange group represented by the following Chemical Formula 12 in a carbon carrier; and forming metal nanoparticles on the polymer layer of the carbon carrier by adding the carbon carrier having the polymer layer formed and a metal precursor to a solvent.

                    [Chemical Formula 12]

In Chemical Formula 12, X is a monovalent cation group.

For the method for preparing the carrier-nanoparticle complex, it is possible to cite those described above for the carrier-nanoparticle complex.

The method for preparing the carrier-nanoparticle complex includes forming a polymer layer having an amine group and a hydrogen ion exchange group represented by the following Chemical Formula 12 in a carbon carrier.

The forming of the polymer layer may be forming a polymer layer by putting a carbon carrier into a solution including polyalkyleneimine and a hydrogen ion exchange polymer or a solution including a polymer derived from a polyalkyleneimine having an amine group and a hydrogen ion exchange polymer having a hydrogen ion exchange group.

The method for preparing the carrier-nanoparticle complex may include: preparing a first solution by adding a carbon carrier, polyalkyleneimine, and a hydrogen ion exchange polymer to a solvent; and stirring the first solution.

The first solution may further include a crosslinking agent. The crosslinking agent may have a reaction group capable of reacting with each of the amine group of the polyalkyleneimine and the hydrogen ion exchange group of the hydrogen ion exchange polymer.

The method for preparing the carrier-nanoparticle complex may include: preparing a first solution by adding a carbon carrier, and a polymer derived from a polyalkyleneimine and a hydrogen ion exchange polymer having a hydrogen ion exchange group to a solvent; and stirring the first solution.

The solvent of the first solution is not particularly limited, but may include at least one of water, ethanol, 2-propanol, and iso-propanol.

Based on the solid content weight of the first solution, the content of the carbon carrier may be 14 wt % or more and 30 wt % or less.

Based on the solid content weight of the first solution, the content of the polyalkyleneimine may be 65 wt % or more and 85 wt % or less.

Based on the solid content weight of the first solution, the content of the hydrogen ion exchange polymer may be 0.1 wt % or more and 5 wt % or less.

When the first solvent further includes a crosslinking agent, based on the solid content weight of the first solution, the content of the carbon carrier may be more than 0 wt % and 3 wt % or less.

When the first solvent includes a carbon carrier, and a polymer derived from a polyalkyleneimine and a hydrogen ion exchange polymer having a hydrogen ion exchange group, based on the solid content weight of the first solution, the content of the carbon carrier may be 14 wt % or more and 30 wt % or less, and the content of the polymer derived from the polyalkyleneimine and the hydrogen ion exchange polymer having the hydrogen ion exchange group may be 70 wt % or more and 86 wt % or less.

Based on the total weight of the first solution, the total content of the solid content of the first solution except for the solvent may be 0.3 wt % or more and 20 wt % or less, and based on the total weight of the first solution, the content of the solvent may be 80 wt % or more and 99.7 wt % or less.

The time for which the first solution is stirred may be 3 hours or more and 72 hours or less.

The method for preparing the carrier-nanoparticle complex includes forming metal nanoparticles on the polymer layer of the carbon carrier by adding the carbon carrier having the polymer layer formed and a metal precursor to a solvent.

The forming of the metal nanoparticles on the polymer layer of the carbon carrier may include: preparing a second solution by adding the carbon carrier having the polymer layer formed and a metal precursor to a solvent; adjusting a pH of the second solution; and stirring the second solution.

The metal precursor is a material before being reduced to metal nanoparticles, and the metal precursor may be selected according to the type of metal nanoparticle.

The solvent of the second solution may include a polyhydric alcohol having two or more hydroxy groups. The polyhydric alcohol is not particularly limited as long as the polyhydric alcohol has two or more hydroxy groups, but may include at least one of ethylene glycol, diethylene glycol, and propylene glycol.

The second solution for forming metal nanoparticles on the polymer layer of the carbon carrier does not include a surfactant. In this case, there is an advantage in that a step of removing a surfactant after synthesizing a catalyst is not necessary, and there is no reduction in active point caused by a surfactant.

Based on the total weight of the second solution, the content of the carbon carrier having the polymer layer formed may be 0.1 wt % or more and 3 wt % or less.

Based on the total weight of the second solution, the content of the metal precursor may be 0.1 wt % or more and 4 wt % or less.

Based on the total weight of the second solution, the content of the solvent may be 93 wt % or more and 98 wt % or less.

In the adjusting the pH of the second solution, the pH of the second solution may be adjusted to 10 to 11, and the method for adjusting the pH is not particularly limited as long as the method may adjust the pH of the second solution, but the pH of the second solution may be adjusted by adding a predetermined amount of NaOH thereto.

The method for preparing the carrier-nanoparticle complex may further include forming metal nanoparticles on a polymer layer of a carbon carrier, and then removing a solvent.

In the removing of the solvent, the solvent is removed, and the metal nanoparticles provided on the polymer layer of the carbon carrier may be sintered.

The removing of the solvent may be carrying out a heat treatment under a hydrogen or argon atmosphere. At this time, the heat treatment temperature may be 180° C. or more and 300° C. or less. At less than 180° C., the solvent may not be completely removed, and at more than 300° C., the polymer on the surface of the carbon carrier may be decomposed or modified.

MODE FOR INVENTION

Hereinafter, the present specification will be described in more detail through Examples. However, the following Examples are provided only for exemplifying the present specification, but are not intended to limit the present specification.

EXAMPLES

Example 1

1 g of polyethyleneimine (PEI, Mw. 1800) and 240 mg of a 5 wt Nafion solution (in propanol/water) were dissolved in 200 ml of water/isopropyl alcohol (IPA), and then 240 mg of raw carbon black was added thereto, and the resulting mixture was stirred for 24 hours. Thereafter, the mixture was washed with distilled water and dried to obtain a carbon carrier which was surface-modified with PEI and Nafion.

After 0.22 mmol of $PtCl_4$ and 65 mg of the carbon carrier which was surface-modified with PEI and Nafion were dissolved in 25 ml of ethylene glycol, the pH was adjusted to 11, and then the solution was stirred for a predetermined time. After the solution was warmed to 160° C., the solution was stirred for 3 hours, and then cooled. The resulting product was washed with ethanol (EtOH) and then dried, and then a heat treatment was carried out under an Ar or Ar/hydrogen atmosphere for 1 hour. As an analysis result of the inductively coupled plasma (ICP), 40 wt % of Pt was supported.

Example 2

1 g of polyethyleneimine (PEI, Mw. 1800) and 1.2 g of a 5 wt % Nafion solution (in propanol/water) were dissolved in 200 ml of water/isopropyl alcohol (IPA), and then 240 mg of raw carbon black was added thereto, and the resulting mixture was stirred for 24 hours. Thereafter, the mixture was washed with distilled water and dried to obtain a carbon carrier which was surface-modified with PEI and Nafion.

After 0.22 mmol of $PtCl_4$ and 65 mg of the carbon carrier which was surface-modified with PEI and Nafion were dissolved in 25 ml of ethylene glycol, the pH was adjusted to 11, and then the solution was stirred for a predetermined time. After the solution was warmed to 160° C., the solution was stirred for 3 hours, and then cooled. The resulting product was washed with ethanol (EtOH) and then dried, and then a heat treatment was carried out under an Ar or Ar/hydrogen atmosphere for 1 hour. As an analysis result of the inductively coupled plasma (ICP), 40 wt % of Pt was supported.

Comparative Example 1

1 g of polyethyleneimine (PEI, Mw. 1800) was dissolved in 200 ml of water, and then 240 mg of raw carbon black and 6 g of $KNO_3$ were added thereto, and the resulting mixture was stirred for 24 hours. The resulting product was washed with distilled water and dried to obtain a carbon carrier coated with PEI.

After 0.22 mmol of $PtCl_4$ and 65 mg of the carbon carrier coated with PEI were dissolved in 25 ml of ethylene glycol, the pH was adjusted to 11, and then the solution was stirred for a predetermined time. After the solution was warmed to 160° C., the solution was stirred for 3 hours, and then cooled. The resulting product was washed with EtOH and then dried, and then a heat treatment was carried out under an Ar or Ar/hydrogen atmosphere for 1 hour. As an analysis result of the inductively coupled plasma (ICP), 40 wt % of Pt was supported.

Experimental Example 1

An image of the carrier-nanoparticle complex prepared in Example 1 measured by a transmission electron microscope (TEM) is illustrated in FIG. 5.

Experimental Example 2

For Comparative Example 1 in which only PEI was supported and Example 1 in which PEI and Nafion were supported, together with PEI used in Example 1, an infrared spectroscopic analysis (FT-IR) graph measured using raw carbon black as a reference is illustrated in FIG. 6, and for Comparative Example 1 in which only PEI was supported and Example 1 in which PEI and Nafion were supported, together with Nafion used in Example 1, an infrared spectroscopic analysis (FT-IR) graph measured using raw carbon black as a reference is illustrated in FIG. 7. As a result, it was confirmed that PEI was supported in Comparative Example 1 and Example 1, and it was confirmed that Nafion was supported in the complex in Example 1.

Experimental Example 3

The content of N and S in the carbon carrier coated with the PEI and Nafion polymers was measured using pyrolysis ion chromatography.

TABLE 1

|  | N (wt %) | S (wt %) |
|---|---|---|
| Example 1 | 1.96 | 0.37 |
| Example 2 | 2.03 | 1.01 |

Experimental Example 4

The surface tensions and contact angles of the carbon carrier coated with the PEI and the Nafion polymers (Example 1) and carbon acid-treated with nitric acid were measured. At this time, as the acid-treated carbon, carbon treated with 5 M nitric acid at 90° C. for 6 hours was used.

The contact angle was measured using a K100 model manufactured by KRUSS Co., Ltd. The surface tension for water was measured. As shown in Table 2, in the case of Example 1, it can be seen that the surface of the carrier is more hydrophilic because the contact angle was approximately 47°, which is smaller than that of the acid-treated carbon, and it can be seen that because the surface tension in Example 1 is larger than that of the acid-treated carbon, the surface is hydrophilic and has a characteristic of further retaining water. Further, due to these hydrophilic characteristics, Example 1 may be more advantageous in terms of dispersion of a catalyst when an ink is prepared, and thus Example 1 may be advantageous in forming a more uniform electrode layer.

TABLE 2

|  | Contact angle (degree) | Surface tension (mN/m$^2$) |
|---|---|---|
| Acid-treated carbon | 90 | 29.2 |
| Example 1 | 47.05 ± 2.74 | 55.43 ± 1.56 |

Experimental Example 5

Example 1, Example 2, Comparative Example 1, and a commercially available catalyst were each mixed with isopropyl alcohol and a 5 wt % Nafion solution, and prepared into a well-dispersed ink. At this time, as the commercially available catalyst, 40 wt % Pt/C manufactured by Johnson Matthey Corp., was used.

In Examples 1 and 2, the Nafion ionomer was added thereto so as for the I/C (ionomer/carbon) to be 0.48, and in Comparative Example 1 and the commercially available catalyst, the Nafion ionomer was added thereto so as for the I/C to be 0.75. The catalyst ink was coated onto a Nafion membrane using a spray device, and then a membrane electrode assembly was prepared by hot pressing the Nafion membrane at 140° C.

The size of the membrane electrode assembly was 2.5 cm×2.5 cm, H$_2$/Air was supplied under 100% humid conditions, the performance of the single cell was measured under 80° C. atmosphere, and the pt per unit area was 0.4 mg/cm$^2$. The results are shown in FIG. 8 and Table 3.

Example 1 had a higher current density than those of Comparative Example 1 and the commercially available catalyst, and exhibited a higher current density in a low voltage region being a mass transfer region than those of Comparative Example 1 and the commercially available catalyst. Since the —SO$_3^-$ functional group of the ionomer present in the carrier can transfer hydrogen ions better to platinum particles, the activity is also enhanced, and Example 1 exhibits better performance than the other catalysts, particularly, in the mass transfer region. In the case of Example 2 in which the content of the ionomer was higher than the others, the performance slightly deteriorated, and the advantage in the mass transfer region was greatly offset. When the amount of ionomer is increased to 1 wt % or more, it is contemplated that the surface of the carrier becomes more hydrophilic, and thus, the discharge of water generated is rather hindered. Further, in the case of Example 1, even though the ionomer was used by reducing the content of the ionomer by about 22% as compared to the commercially available catalyst during the preparation of the catalyst ink, a better performance was exhibited. Since the —SO$_3^-$ functional group was present on the surface of the carbon carrier, hydrogen ions could be sufficiently transferred with even a smaller amount of ionomer. In general, it is known that during the preparation of the catalyst ink, the optimal amount of ionomer is between 33% to 50% of the catalyst weight.

TABLE 3

|  | Example 1 | Example 2 | Comparative Example 1 | Commercially available catalyst |
|---|---|---|---|---|
| Current density (A/cm$^2$) @ 0.6 V | 1.15 | 1.0 | 1.12 | 1.0 |
| Current density (A/cm$^2$) @ 0.3 V | 1.61 | 1.47 | 1.47 | 1.43 |

The invention claimed is:
1. A carrier-nanoparticle complex comprising:
a carbon carrier;
a polymer layer provided on a surface of the carbon carrier, the polymer layer comprising:
a polyalkyleneimine having an amine group, and comprising:
at least one repeating unit of Chemical Formula 1:

[Chemical Formula 1]

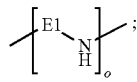

and
at least one repeating unit of Chemical Formula 2:

[Chemical Formula 2]

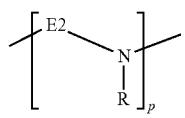

wherein in Chemical Formulae 1 and 2:
E1 and E2 are each independently a straight or branched alkylene group having 2 to 10 carbon atoms,
R is a substituent of any one of the following Chemical Formulae 3 to 5, and
o and p are each an integer from 1 to 1,000,

[Chemical Formula 3]

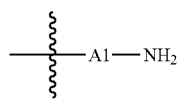

[Chemical Formula 4]

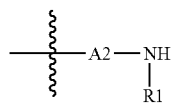

[Chemical Formula 5]

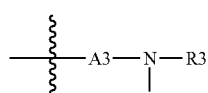

wherein in Chemical Formulae 3 to 5,
A1 to A3 are each independently a straight or branched alkylene group having 2 to 10 carbon atoms, and
R1 to R3 are each independently a substituent of one of Chemical Formulae 6 to 8,

[Chemical Formula 6]

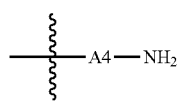

[Chemical Formula 7]

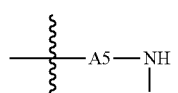

[Chemical Formula 8]

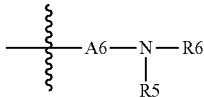

wherein in Chemical Formulae 6 to 8:
A4 to A6 are each independently a straight or branched alkylene group having 2 to 10 carbon atoms, and
R4 to R6 are each independently a substituent of Chemical Formula 9,

[Chemical Formula 9]

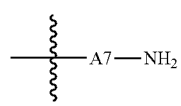

wherein in Chemical Formula 9,
A7 is a straight or branched alkylene group having 2 to 10 carbon atoms; and
a hydrogen ion exchange polymer having a hydrogen ion exchange group of Chemical Formula 12:

$$-SO_3^- X$$  [Chemical Formula 12]

wherein X is a monovalent cation group; and
metal nanoparticles provided on the polymer layer,
wherein the polymer layer includes a polymer in which a hydrogen ion exchange group of the hydrogen ion exchange polymer and the amine group of the polyalkyleneimine are crosslinked to each other to form a sulfonamide bonding structure.

2. A carrier-nanoparticle complex, comprising:
a carbon carrier;
a polymer layer provided on a surface of the carbon carrier, the polymer layer comprising:
a polyalkyleneimine comprising a compound of Chemical Formula 11 below, and a hydrogen ion exchange polymer having a hydrogen ion exchange group of Chemical Formula 12 below; and
metal nanoparticles provided on the polymer layer,
wherein the polymer layer includes a polymer in which a hydrogen ion exchange group of the hydrogen ion exchange polymer and the amine group of the polyalkyleneimine are crosslinked to each other to form a sulfonamide bonding structure:

[Chemical Formula 11]

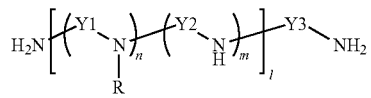

wherein in Chemical Formulae 11:
Y1, Y2, and Y3 are each independently an alkylene group having 2 to 10 carbon atoms,
R is a substituent of one of Chemical Formulae 3 to 5,
n and m are each an integer from 1 to 5,
l is an integer from 1 to 200,

[Chemical Formula 3]
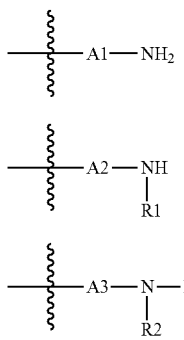

[Chemical Formula 4]
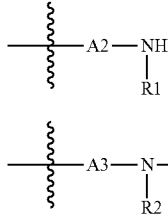

[Chemical Formula 5]
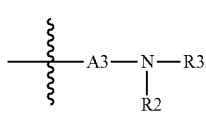

wherein in Chemical Formulae 3 to 5:
A1 to A3 are each independently an alkylene group having 2 to 10 carbon atoms,
R1 to R3 are each independently a substituent of any one of Chemical Formulae 6 to 8,

[Chemical Formula 6]
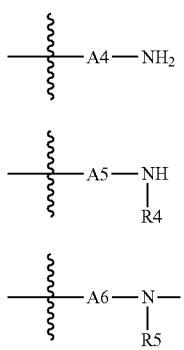

[Chemical Formula 7]
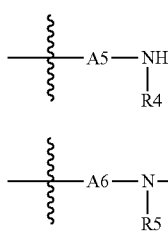

[Chemical Formula 8]
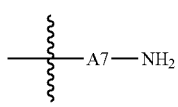

wherein in Chemical Formulae 6 to 8:
A4 to A6 are each independently an alkylene group having 2 to 10 carbon atoms, and
R4 to R6 are each independently a substituent of Chemical Formula 9:

[Chemical Formula 9]

wherein in Chemical Formula 9:
A7 is an alkylene group having 2 to 10 carbon atoms;

—$SO_3^-X$    [Chemical Formula 12]

wherein in Chemical Formula 12, X is a monovalent cation group.

3. The carrier-nanoparticle complex of claim 1, wherein the metal nanoparticles are bonded to the amine group of the polymer layer.

4. The carrier-nanoparticle complex of claim 1, wherein based on the total elements on a surface of the polymer layer, the content of the nitrogen element of the amine group is greater than or equal to 0.01% by weight and less than or equal to 5% by weight, and the content of the sulfur element of the hydrogen ion exchange group of Chemical Formula 12 is greater than or equal to 0.01% by weight and less than or equal to 1% by weight.

5. The carrier-nanoparticle complex of claim 1, wherein a weight ratio of the polyalkyleneimine to the hydrogen ion exchange polymer is 15 or more and 100 or less.

6. A catalyst comprising the carrier-nanoparticle complex of claim 1.

7. An electrochemical battery comprising the catalyst of claim 6.

8. A membrane electrode assembly comprising:
an anode catalyst layer;
a cathode catalyst layer; and
a polymer electrolyte membrane provided between the anode catalyst layer and the cathode catalyst layer,
wherein the anode catalyst layer or the cathode catalyst layer comprises the carrier-nanoparticle complex according to claim 1.

9. The membrane electrode assembly of claim 8, wherein the anode catalyst layer and the cathode catalyst layer each comprises an ionomer.

10. A method for preparing a carrier-nanoparticle complex, the method comprising:
forming on a surface of a carbon carrier a polymer layer comprising:
a polyalkyleneimine having an amine group and comprising:
at least one repeating unit of Chemical Formula 1:

[Chemical Formula 1]
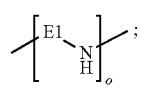

and
at least one repeating unit of Chemical Formula 2:

[Chemical Formula 2]
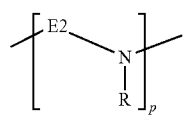

wherein in Chemical Formulae 1 and 2:
E1 and E2 are each independently a straight or branched alkylene group having 2 to 10 carbon atoms,
R is a substituent of any one of the following Chemical Formulae 3 to 5, and
and p are each an integer from 1 to 1,000,

[Chemical Formula 3]
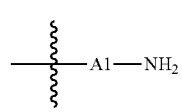

[Chemical Formula 4]
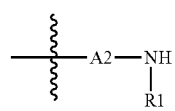

-continued

[Chemical Formula 5]

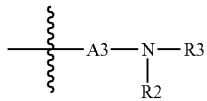

wherein in Chemical Formulae 3 to 5,
A1 to A3 are each independently a straight or branched alkylene group having 2 to 10 carbon atoms, and
R1 to R3 are each independently a substituent of one of Chemical Formulae 6 to 8,

[Chemical Formula 6]

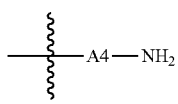

[Chemical Formula 7]

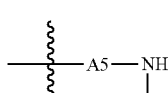

[Chemical Formula 8]

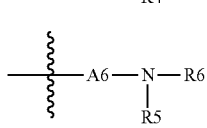

wherein in Chemical Formulae 6 to 8:
A4 to A6 are each independently a straight or branched alkylene group having 2 to 10 carbon atoms, and
R4 to R6 are each independently a substituent of Chemical Formula 9,

[Chemical Formula 9]

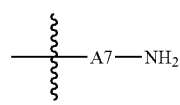

wherein in Chemical Formula 9,
A7 is a straight or branched alkylene group having 2 to 10 carbon atoms, and a hydrogen ion exchange polymer having a hydrogen ion exchange group of Chemical Formula 12:

$—SO_3^-X$ [Chemical Formula 12]

wherein in Chemical Formula 12, X is a monovalent cation group, and
forming metal nanoparticles on the polymer layer by adding the carbon carrier having the polymer layer formed thereon and a metal precursor to a solvent,
wherein the polymer layer includes a polymer in which the hydrogen ion exchange group of the hydrogen ion exchange polymer and the amine group of the polyalkyleneimine are crosslinked to each other to form a sulfonamide bonding structure.

11. The method of claim 10, wherein the forming of the polymer layer comprises adding the carbon carrier into a solution comprising the polyalkyleneimine and the hydrogen ion exchange polymer.

12. The carrier-nanoparticle complex of claim 2, wherein the metal nanoparticles are bonded to the amine group of the polymer layer.

13. The carrier-nanoparticle complex of claim 2, wherein based on the total elements on a surface of the polymer layer, the content of the nitrogen element of the amine group is greater than or equal to 0.01% by weight and less than or equal to 5% by weight, and the content of the sulfur element of the hydrogen ion exchange group of Chemical Formula 12 is greater than or equal to 0.01% by weight and less than or equal to 1% by weight.

14. The carrier-nanoparticle complex of claim 2, wherein a weight ratio of the polyalkyleneimine to the hydrogen ion exchange polymer is 15 or more and 100 or less.

15. A catalyst comprising the carrier-nanoparticle complex of claim 2.

16. An electrochemical battery comprising the catalyst of claim 15.

17. A membrane electrode assembly comprising:
an anode catalyst layer;
a cathode catalyst layer; and
a polymer electrolyte membrane provided between the anode catalyst layer and the cathode catalyst layer,
wherein the anode catalyst layer or the cathode catalyst layer comprises the carrier-nanoparticle complex according to claim 2.

18. The membrane electrode assembly of claim 17, wherein the anode catalyst layer and the cathode catalyst layer each comprises an ionomer.

* * * * *